US008463412B2

(12) United States Patent
Ramabadran et al.

(10) Patent No.: US 8,463,412 B2
(45) Date of Patent: Jun. 11, 2013

(54) METHOD AND APPARATUS TO FACILITATE DETERMINING SIGNAL BOUNDING FREQUENCIES

(75) Inventors: Tenkasi V. Ramabadran, Naperville, IL (US); Mark A. Jasiuk, Chicago, IL (US)

(73) Assignee: Motorola Mobility LLC, Libertyville, IL (US)

( * ) Notice: Subject to any disclaimer, the term of this patent is extended or adjusted under 35 U.S.C. 154(b) by 1088 days.

(21) Appl. No.: 12/195,837

(22) Filed: Aug. 21, 2008

(65) Prior Publication Data

US 2010/0049342 A1 Feb. 25, 2010

(51) Int. Cl.
*G06F 17/00* (2006.01)

(52) U.S. Cl.
USPC ............. 700/94; 381/104; 381/105; 381/106; 381/107; 704/203; 704/219; 704/268; 704/500

(58) Field of Classification Search
USPC .................. 381/104–107; 704/203, 219, 268, 704/500
See application file for complete search history.

(56) References Cited

U.S. PATENT DOCUMENTS

| | | | |
|---|---|---|---|
| 4,771,465 | A | 9/1988 | Bronson et al. |
| 5,245,589 | A | 9/1993 | Abel et al. |
| 5,455,888 | A | 10/1995 | Iyengar et al. |
| 5,579,434 | A | 11/1996 | Kudo et al. |
| 5,581,652 | A | 12/1996 | Abe et al. |
| 5,794,185 | A | 8/1998 | Bergstrom et al. |
| 5,878,388 | A | 3/1999 | Nishiguchi et al. |
| 5,949,878 | A | 9/1999 | Burdge et al. |
| 5,950,153 | A | 9/1999 | Ohmori et al. |
| 5,978,759 | A | 11/1999 | Tsushina et al. |
| 6,009,396 | A | 12/1999 | Nagata |
| 6,453,287 | B1 | 9/2002 | Unno et al. |
| 6,680,972 | B1 | 1/2004 | Liljeryd et al. |
| 6,708,145 | B1 | 3/2004 | Liljeryd et al. |

(Continued)

FOREIGN PATENT DOCUMENTS

| | | | |
|---|---|---|---|
| CN | 1272259 | A | 11/2000 |
| EP | 1367566 | B1 | 8/2005 |

(Continued)

OTHER PUBLICATIONS

EPC Communication pursuant to Article 94(3), for App. No. 09707285.4, mailed Dec. 12, 2011, all pages.

(Continued)

*Primary Examiner* — Evan Pert
*Assistant Examiner* — Mark A Laurenzi

(57) ABSTRACT

A signal processing platform (300) presents (101) a signal to be processed and identifies (102) signal portions with specific characteristics that are used (103) to automatically determine at least one bounding frequency that can be used to facilitate bandwidth extension for the signal. Identifying these signal portions can comprise identifying signal portions that exhibit at least a predetermined level of energy. The step of determining the bounding frequency can comprise computing a magnitude spectrum for each of the identified signal portions that can be used to determine a corresponding measure of flatness within a pass band as pertains to a corresponding normalized signal portion to thereby provide corresponding vetted signal portions. Determining the bounding frequency can then comprise accumulating the magnitude spectrum for these vetted signal portions and using the resultant accumulation to estimate a corresponding signal envelope. This signal envelope can then be used to determine the at least one bounding frequency.

8 Claims, 2 Drawing Sheets

U.S. PATENT DOCUMENTS

| | | | | |
|---|---|---|---|---|
| 6,732,075 | B1 | 5/2004 | Omori et al. | |
| 6,895,375 | B2 | 5/2005 | Malah et al. | |
| 7,181,402 | B2 | 2/2007 | Jax et al. | |
| 7,328,162 | B2 | 2/2008 | Liljeryd et al. | |
| 7,359,854 | B2 | 4/2008 | Nilsson et al. | |
| 7,461,003 | B1 | 12/2008 | Tanrikuli | |
| 7,483,758 | B2 | 1/2009 | Liljeryd et al. | |
| 7,490,036 | B2 | 2/2009 | Jasiuk et al. | |
| 7,546,237 | B2 | 6/2009 | Nongpiur et al. | |
| 7,555,434 | B2 | 6/2009 | Nomura et al. | |
| 7,844,453 | B2 | 11/2010 | Hetherington | |
| 7,941,319 | B2 | 5/2011 | Nomura et al. | |
| 8,069,040 | B2 | 11/2011 | Vos | |
| 8,229,106 | B2 | 7/2012 | Greiss et al. | |
| 8,249,861 | B2 | 8/2012 | Li et al. | |
| 2002/0007280 | A1 | 1/2002 | McCree | |
| 2002/0097807 | A1 | 7/2002 | Gerrits | |
| 2002/0138268 | A1 | 9/2002 | Gustafsson | |
| 2003/0009327 | A1 * | 1/2003 | Nilsson et al. | 704/219 |
| 2003/0050786 | A1 | 3/2003 | Jax et al. | |
| 2003/0093278 | A1 | 5/2003 | Malah | |
| 2003/0187663 | A1 | 10/2003 | Truman et al. | |
| 2004/0078205 | A1 | 4/2004 | Liljeryd et al. | |
| 2004/0128130 | A1 | 7/2004 | Rose et al. | |
| 2004/0174911 | A1 | 9/2004 | Kim et al. | |
| 2004/0247037 | A1 | 12/2004 | Honma et al. | |
| 2005/0004793 | A1 | 1/2005 | Ojala et al. | |
| 2005/0065784 | A1 | 3/2005 | McAulay et al. | |
| 2005/0094828 | A1 | 5/2005 | Sugimoto | |
| 2005/0143985 | A1 | 6/2005 | Sung et al. | |
| 2005/0143989 | A1 | 6/2005 | Jelinek | |
| 2005/0143997 | A1 | 6/2005 | Huang et al. | |
| 2005/0165611 | A1 | 7/2005 | Mehrotra et al. | |
| 2005/0171785 | A1 | 8/2005 | Nomura et al. | |
| 2006/0224381 | A1 | 10/2006 | Makinen | |
| 2006/0282262 | A1 | 12/2006 | Vos et al. | |
| 2006/0293016 | A1 | 12/2006 | Giesbrecht et al. | |
| 2007/0033023 | A1 | 2/2007 | Sung et al. | |
| 2007/0109977 | A1 | 5/2007 | Mittal et al. | |
| 2007/0124140 | A1 | 5/2007 | Iser et al. | |
| 2007/0150269 | A1 | 6/2007 | Nongpiur et al. | |
| 2007/0208557 | A1 | 9/2007 | Li et al. | |
| 2007/0238415 | A1 | 10/2007 | Sinha et al. | |
| 2008/0004866 | A1 | 1/2008 | Virolainen et al. | |
| 2008/0027717 | A1 | 1/2008 | Rajendran et al. | |
| 2008/0120117 | A1 | 5/2008 | Choo et al. | |
| 2008/0177532 | A1 | 7/2008 | Greiss et al. | |
| 2009/0144062 | A1 | 6/2009 | Ramabadran et al. | |
| 2009/0198498 | A1 | 8/2009 | Ramabadran et al. | |
| 2009/0201983 | A1 | 8/2009 | Jasiuk et al. | |
| 2010/0198587 | A1 | 8/2010 | Ramabadran et al. | |
| 2011/0112844 | A1 | 5/2011 | Jasiuk et al. | |
| 2011/0112845 | A1 | 5/2011 | Jasiuk et al. | |

FOREIGN PATENT DOCUMENTS

| | | | |
|---|---|---|---|
| EP | 1439524 | A1 | 7/2007 |
| EP | 1 892 703 | A1 | 2/2008 |
| JP | 90166198 | A | 1/1997 |
| KR | 1020060085118 | A | 7/2006 |
| WO | 9857436 | A2 | 12/1998 |
| WO | 02086867 | A1 | 10/2002 |
| WO | 2009070387 | A1 | 6/2009 |
| WO | 2009099835 | A1 | 8/2009 |

OTHER PUBLICATIONS

Arora, et al., "High Quality Blind Bandwidth Extension of Audio for Portable Player Applications," Proceedings of the AES 120th Convention, May 20-23, 2006, Paris, France, pp. 1-6.

Annadana, et al., "A Novel Audio Post-Processing Toolkit for the Enhancement of Audio Signals Coded at Low Bit Rates," Proceedings of the AES 123rd Convention, Oct. 5-8, 2007, New York, NY, USA, pp. 1-7.

Larsen et al., "Efficient High-Frequency Bandwidth Extension of Music and Speech;" Audio Engineering Society Convention Paper 5627; Presented at the 112th Convention Munich Germany, May 10-13, 2002; 5 pages.

Chennoukh et al: "Speech Enhancement Via Frequency Bandwidth Extension Using Line Spectral Frequencies", 2001, IEEE, Phillips Research Labs, pp. 665-668.

Hsu: "Robust bandwidth extension of narrowband speech", Master thesis, Department of Electrical & Computer Engineering, McGill University, Canada, Nov. 2004, all pages.

J. Epps et al.,"A New Technique for Wideband Enhancement of Coded Narrowband Speech," Proc. 1999 IEEE Workshop on Speech Coding, pp. 174-176, Porvoo, Finland, Jun. 1999.

Van Ming Cheng et al., "Statisticval Recovery of Wideband Speech From Narrowband Speech," IEEE Transactions on Speech and Audio Processing, vol. 2, No. 4, pp. 544-546, Oct. 1994.

Peter Jax et al., "Wideband Extension of Telephone Speech Using a Hidden Markov Model," Institute of Communication Systems and Data Processing, RWTH Aachen, Templegrabel 55, D-52056 Aachen, pp. 133-135, Germany @2000 IEEE.

Julien Epps, "Wideband Extension of Narrowband Speech for Enhancement and Coding," School of Electrical Engineering and Telecommunications, The University of New South Wales, pp. 1-155, A thesis submitted to fulfill the requirements of the degree of Doctor of Philosophy Sep. 2000.

Laaksonen et al.; "Artificial Bandwidth Expansion Mehod to Improve Intelligibility and Quality of AMR-Coded Narrowband Speech," Multimedia Technologies Laboratory and Helsinki University of Technology, pp. 1-809-812@2005 IEEE.

Kontio et al.; "Neural Network-Based Artificial Bandwidth Expansion of Speech," IEEE Transactions on Audio, Speech, and Language Processing, pp. 1-9, @2006 IEEE.

Park et al.; "Narrowband to Wideband Conversion of Speech Using GMM Based Transformation," Dept. of Electronics Engineering, Pusan National University, pp. 1843-1846 @2000 IEEE.

Harald Gustafsson e al.; "Low-Complexity Feature-Mapped Speech Bandwidth Extension," IEEE Transactions on Audio, Speech, and Language Processing, vol. 14, No. 2, pp. 577-588, Mar. 2006.

Uysal et al.; "Bandwidth Extension of Telephone Speech Using Frame-Based Excitation and Robust Features," Computational NeuroEngineering Laboratory, The University of Florida.

Kornagel, "Improved Artificial Low-Pass Extension of Telephone Speech," International Workshop on Acoustic Echo and Noise Control (IWAENC2003), Sep. 2003, Kyoto, Japan.

Holger Carl et al., "Bandwidth Enhancement of Narrow-Band Speech Signals," Signal Processing VII: Theories and Applications @1993 Supplied by The British Library—The World's Knowledge.

Mattias Nilsson et al.: "Avoiding Over-Estimation in Bandwidth Extension of Telephony Speech", Deptment of Speech, Music and Hearing KTH (Royal Intitute of Technology) pp. 869-872 @2001 IEEE.

Gustafssen et al., "Low-Complexity Feature-Mapped Speech Bandwidth Extension" IEEE Transactions on Audio, Speech, and Language Processing, vol. 14, No. 2, Mar. 2006, pp. 577-588.

Epps et al Speech Enhancement Using STC-Based Bandwidth Extension 19981001, Oct. 1, 1998, p. P711, XP007000515; section 3.6.

General Aspects of Digital Transmission Systems; Terminal Equipments; 7 kHz Audio—Coding Within 64 KBIT/S; ITU-T Recommendation G.722, International Telecommunication Union; 1988.

3rd General Partnership Project; Technical Specification Group Services and System Aspects; Speech Codec speech processing functions; AMR Wideband Speech Code; General Description (Release 5); Global System for Mobile Communications; 3GPP TS 26.171.

F. Henn, R. Bohm, S. Meltzer, T. Ziegler, "Spectral Band Replication (SBR) Technology and its Application in Broadcasting," 2003.

H. Yasukawa, "Implementation of Frequency-Domain Digital Filter for Speech Enhancement," ICECS Proceedings, vol. 1, pp. 518-521, 1996.

J. Makhoul, M. Berouti, "High Frequency Regeneration in Speech Coding Systems," ICASSP Proceedings, pp. 428-431, 1979.

A. McCree, "A 14 kb/s Wideband Speech Coder with a Parametric Highband Model," ICASSP Proceedings, pp. 1153-1156, 2000.

H. Tolba, D. O'Shaughnessy, "On the Application of the AM-FM Model for the Recovery of Missing Frequency Bands of Telephone Speech," ICSLP Proceedings, pp. 1115-1118, 1998.

C-F. Chan, and W-K. Jui, "Wideband Enhancement of Narrowband Coded Speech Using MBE Re-Synthesis," ICSP Proceedings, pp. 667-670, 1996.

N. Enbom, W.B. Kleijn, "Bandwidth Expansion of Speech based on Vector Quantization of the Mel-Frequency Cepstral Coefficients," Speech Coding Workshop Proceedings, pp. 171-173, 1999.

B. Iser, G. Schmidt, "Neural Networks versus Codebooks in an Application for Bandwidth Extension of Speech Signals," European Conference on Speech Communication Technology, 2003.

G. Miet, A. Gerrits, J.C. Valiere, "Low-band Extension of Telephone band Speech," ICASSP Proceedings, pp. 1851-1854, 2000.

Y. Nakatoh, M. Tsushima, T. Norimatsu, "Generation of Broadband Speech from Narrowband Speech using Piecewise Linear Mapping," EUROSPEECH Proceedings, pp. 1643-1646, 1997.

M. Nilsson, V. Andersen, and W.B. Kleijn, "On the Mutual Information between Frequency Bands in Speech," ICASSP Proceedings, pp. 1327-1330, 2000.

J.R. Deller, Jr., J.G. Proakis, and J.H.L. Hansen, "Discrete-Time Processing of Speech Signals," Chapter 5—Linear Prediction Analysis, McMillan, 1993.

M. Jasiuk and T. Ramabadran, "An Adaptive Equalizer for Analysis-by-Synthesis Speech Coders," EUSIPCO Proceedings, 2006.

Rabiner et al, "Digital Processing of Speech Signals", Englewood Cliffs, pp. 274-277, NJ: Prentice-Hall, 1978.

Martine Wolters et al., "A closer look into MPEG-4 High Efficiency AAC," Audio Engineering Society Convention Paper presented at the 115th Convention, Oct. 10-13 2003, New York, USA.

Chinese Patent Office (SIPO) Second Office Action for Chinese Patent Application No. 200980103691.5 dated Aug. 3, 2012, 12 pages.

United States Patent and Trademark Office, "Final Rejection" for U.S. Appl. No. 11/946,978, dated Sep. 10, 2012, 16 pages.

The State Intellectual Property Office of the People'S Republic of China, Notification of Third Office Action for Chinese Patent Application No. 200980104372.6 dated Oct. 25, 2012, 10 pages.

European Patent Office, "Exam Report" for European Patent Application No. 08854969.6 dated Feb. 21, 2013, 4 pages.

United States Patent and Trademark Office, "Notice of Allowance and Fee(s) Due" for U.S. Appl. No. 12/024,620 dated Nov. 13, 2012, 12 pages.

* cited by examiner

METHOD AND APPARATUS TO FACILITATE DETERMINING SIGNAL BOUNDING FREQUENCIES

TECHNICAL FIELD

This invention relates generally to signal processing and more particularly to audio signal processing.

BACKGROUND

Various devices serve, at least in part, to process signals that are bounded, one way or the other, by a given bandwidth. In many cases this is done to ensure that the signal fits within some limited processing capability as corresponds to the processing platform and/or the application setting. For example, some processing platforms (such as cellular telephones) often limit the audio signal to be processed to some predetermined bandwidth such as 300 to 3,400 Hz even though the original speech content may include frequencies that are outside that range.

In recognition of the fact that such constraints can limit sound quality, some platforms further process such a signal using artificial bandwidth extension. Generally speaking, artificial bandwidth extension typically comprises adding artificially generated content outside the aforementioned predetermined bandwidth to the processed signal in order to hopefully improve the resultant sound quality.

Unfortunately, the success of such an approach can itself be quite arbitrary and unpredictable. In some cases, the corresponding result can be natural sounding and relatively pleasing to the listener. In other cases, however, the bandwidth extended result can be quite unnatural and unpleasant. At worst, the introduction of this artificially generated content can make it more difficult to discern the substantive content of the original audio content.

BRIEF DESCRIPTION OF THE DRAWINGS

The above needs are at least partially met through provision of the method and apparatus to facilitate determining signal bounding frequencies described in the following detailed description, particularly when studied in conjunction with the drawings, wherein.

Figure 1:
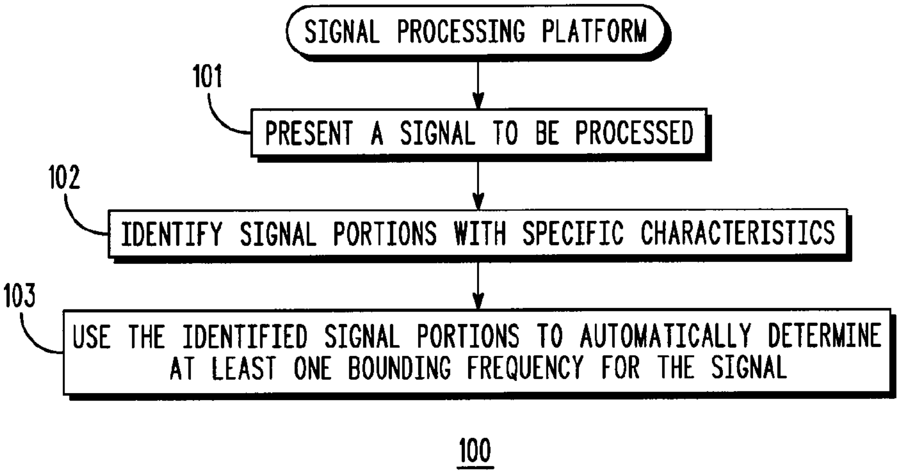
FIG. 1 comprises a flow diagram as configured in accordance with various embodiments of the invention.

Skilled artisans will appreciate that elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention. It will further be appreciated that certain actions and/or steps may be described or depicted in a particular order of occurrence while those skilled in the art will understand that such specificity with respect to sequence is not actually required. It will also be understood that the terms and expressions used herein have the ordinary technical meaning as is accorded to such terms and expressions by persons skilled in the technical field as set forth above except where different specific meanings have otherwise been set forth herein.

DETAILED DESCRIPTION

Generally speaking, pursuant to these various embodiments, a signal processing platform presents a signal to be processed (such as a digitized audio signal) and then identifies signal portions with specific characteristics to provide corresponding identified signal portions. The latter are then used to automatically determine at least one bounding frequency for the signal. This (or these) bounding frequency(s) can then be used to facilitate bandwidth extension for the signal. By one approach, this step of identifying signal portions with specific characteristics can comprise identifying signal portions that exhibit at least a predetermined level of energy. In such a case, the step of determining the bounding frequency can comprise, at least in part, computing a magnitude spectrum for each of the identified signal portions.

By one approach, if desired, the aforementioned magnitude spectrum can be used to determine a corresponding measure of flatness within a pass band as pertains to a corresponding normalized signal portion to thereby provide corresponding vetted signal portions. In such a case, and again if desired, the step of determining the bounding frequency(s) can comprise accumulating the magnitude spectrum for these vetted signal portions to thereby provide an accumulated magnitude spectrum, and then using the latter to estimate a corresponding signal envelope. This signal envelope can then be used to determine the bounding frequency(s).

By one approach, for example, these teachings will then accommodate performing bandwidth extension for the signal using high-band edge detection for the signal, at least in part, by automatically performing bandwidth extension for the signal using a lowest expected value of the high-band edge, then using an available narrow-band signal up to a detected high-band edge, and then using a bandwidth-extended signal above the detected high band edge to represent the signal.

As another example in these regards, these teachings will accommodate performing bandwidth extension for a signal by detecting a low-band edge that is below a highest expected value of the low-band edge to provide a corresponding detected low-band edge. A low-band boost characteristic can then be adjusted based on this detected low-band edge to provide a corresponding adjusted low-band boost characteristic. This adjusted low-band boost characteristic can then be applied to the signal to obtain a resultant boosted low-band signal.

Those skilled in the art will recognize and appreciate that these teachings provide for the detection of band edges for a given signal. These teachings then contemplate and readily accommodate using that information to effect bandwidth extension. The bandwidth extension results themselves can be considerably superior in terms of audio quality as compared to numerous prior art approaches. This results, at least in part, due to a better accommodation and use of existing content in the original signal. This, in turn, reduces the amount of fabricated content to be included in the resultant bandwidth-extended signal in many cases.

It will further be appreciated that these teachings are readily and economically facilitated by leveraging available processing platforms. The corresponding computational requirements are relatively modest, thereby rendering these teachings suitable for processing platforms (such as, but not limited to, cellular telephones or the like) having limited local processing resources (such as available power reserves, computational capabilities, and so forth). It will further be appreciated that these teachings are highly scalable and can be usefully employed with a variety of signals, bandwidth requirements and/or opportunities, and so forth.

These and other benefits may become clearer upon making a thorough review and study of the following detailed description. Referring now to the drawings, and in particular to FIG. 1, an illustrative process that is compatible with many of these teachings will now be presented. This process 100 can be carried out by a signal processing platform of choice. Examples in this regard include, but are certainly not limited to, cellular telephones, push-to-talk wireless devices (such as so-called walkie talkies), landline telephones, so-called Internet telephones, and so forth.

This process 100 includes the step 101 of presenting a signal to be processed. For many application settings of interest, this signal will comprise audio content. In many cases, this step of presenting this signal will comprise presenting a plurality of sequential samples (such as digital samples) of the audio content. This step might comprise, for example, presenting a frame of such information that comprises 1,024 sequential samples that were obtained using an 8 KHz sampling rate. This step might also comprise, for example, presenting a window of content that comprises a plurality of such frames. A window having a duration of about 1 to 3 seconds, for example, may be quite useful in a wide variety of common application settings involving audio signals that include human speech.

This process 100 then presents the step 102 of identifying signal portions of the signal with specific characteristics to thereby provide corresponding identified signal portions. By one approach, for example, this signal portion can comprise a predetermined temporal or data quantity such as the aforementioned frames. In such a case, this step can comprise identifying specific frames that exhibit the specific characteristics of interest.

By one approach, this specific characteristic can comprise a predetermined level of energy. In such a case, this step of identifying signal portions of the signal having a specific characteristic of interest can comprise identifying signal portions that exhibit, for example, at least this predetermined level of energy.

This process 100 then presents the step 103 of using these identified signal portions to automatically determine at least one bounding frequency for the signal. This can comprise, for example, determining a lower bounding frequency, an upper bounding frequency, or both the upper and lower bounding frequencies for the signal as desired. By one approach, this step can comprise automatically determining the at least one bounding frequency for the signal as pertains to each of at least some of a sequential series of groups of sequential samples for the audio content as may comprise the signal. For example, and as alluded to above, it may be useful in many application settings to make this determination for groups of sequential audio content samples with each group representing from about one second to about three seconds of the audio content.

In this regard, those skilled in the art may note and appreciate that the aforementioned groups and the aforementioned signal portions may, or may not, tightly correlate with respect to one another depending upon the needs and/or opportunities as tend to characterize a given application setting. By one approach, for example, the aforementioned identified signal portions can fall within the aforementioned group. It will be understood that the groups that are selected for determining the bounding frequency, however, do not necessarily have to be selected from a sequential series of groups. It would be possible, for example, for the selected groups to overlap with one another in time.

This process 100 will readily accommodate carrying out these steps, if desired, in any of a variety of ways. By one approach, for example, these steps can include computing a magnitude spectrum for each of the identified signal portions. This magnitude spectrum can then be used to determine a corresponding measure of flatness within a pass band as pertains to a corresponding normalized signal portion to thereby provide vetted signal portions. Such an approach will support, for example, the further steps of accumulating the magnitude spectrum for the vetted signal portions to provide corresponding accumulated magnitude spectrum, using that accumulated magnitude spectrum to estimate a signal envelope as corresponds to the vetted signal portions, and then using that signal envelope to determine the aforementioned bounding frequency(s).

As another example in this regard, if desired, this process 100 will readily accommodate using transformed versions of the magnitude spectrum to effect the aforementioned accumulation. Such transformations can be based on the magnitude spectrum itself, but in such a case it will not be the magnitude spectrum itself that is being accumulated. Useful transforms in this regard include, but are not limited to, raising the magnitude spectrum to a power other than one (such as, but not limited to, a power greater than one), performing a log operation on the magnitude spectrum followed by a multiplication step (for example, to convert the results into decibels), and so forth.

For the sake of illustration, additional details as pertain to a particular example will now be provided in these regards. Those skilled in the art will recognize and understand that the specifics of this example serve an illustrative purpose only and are not offered with any suggestion or intent that these specifics comprise an exhaustive listing of all such possibilities in this regard.

In a not untypical artificial speech bandwidth extension (BWE) system, input narrow-band speech (contained within, for example, 300-3400 Hz) is transformed to a corresponding wideband speech (such as 100-8000 Hz) output by synthesizing the missing information based on parameters extracted from the narrow-band speech itself. This input narrow-band (NB) speech is first analyzed using linear prediction (LP) coefficient analysis to extract the spectral envelope. From the NB coefficients, the wideband LP coefficients are estimated (using, for example, codebook mapping as is known in the art). The narrow-band LP coefficients are also used to inverse filter the input speech to obtain the NB excitation signal in the (1:2) up-sampled domain.

From this signal, the wideband (WB) excitation signal is synthesized (using, for example, a non-linear operation such as rectification). An LP filter (employing the estimated WB coefficients) is then used to filter the WB excitation and to synthesize the wideband speech. The resultant synthesized wideband speech is high-pass filtered and added to the (1:2 up-sampled version of the) input NB speech to obtain the estimated wideband output speech.

A typical application scenario for such a BWE system is in cellular phones wherein such a system can be used to extend the bandwidth of the received audio to enhance the user experience. In designing a BWE system for such an application, it is generally assumed that the input NB signal has a specific bandwidth such as 300-3400 Hz. In many application settings, however, the bandwidth of the channel is not fixed but can and will vary from call to call (or even within the experience of a single call).

The present teachings permit detecting the band edges of the received signal so that the original information is retained to a considerable extent (for example, from about 200 to 3600 Hz) and artificially generated information is added only where required or where at least likely to be helpful (for example, from about 100 to 200 Hz and from about 3600 to 8000 Hz).

Figure 2:
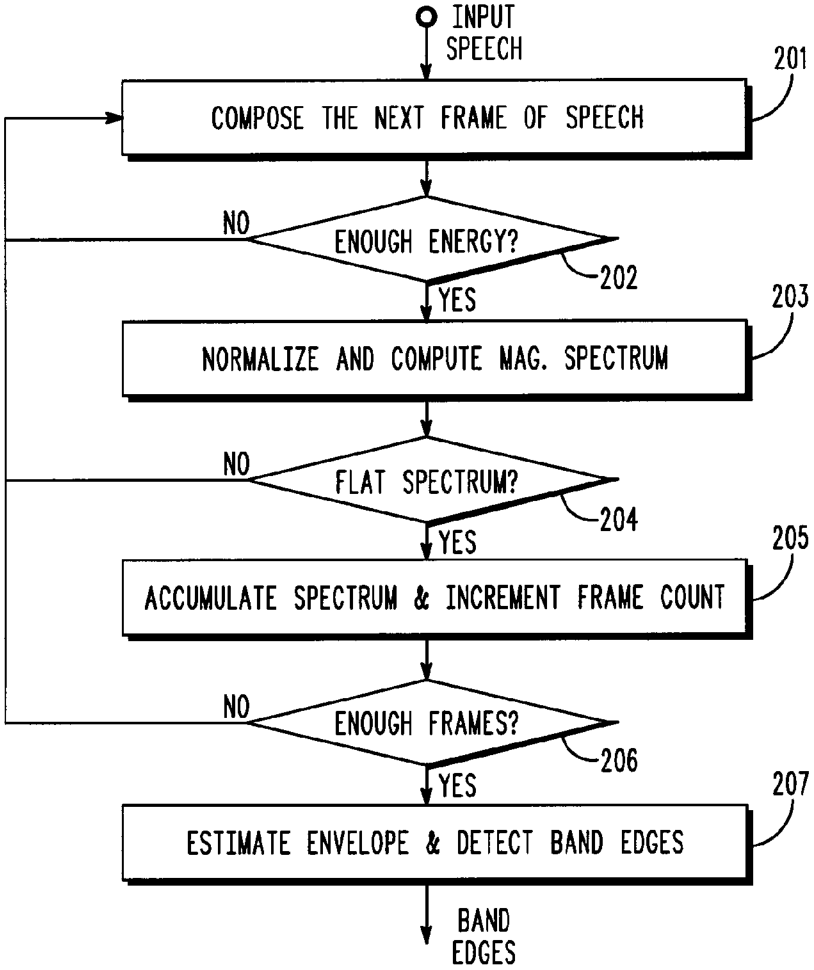
FIG. 2 comprises a flow diagram as configured in accordance with various embodiments of the invention.

Referring now to FIG. 2, one illustrative example of a band edge detection algorithm as comports with these teachings is shown. In a first step 201, the input NB speech is composed into blocks of consecutive samples, referred to herein as frames. For example, the $k^{th}$ frame may be expressed as $$F_k=\{s(n_k+i), i=0, 1, \dots, N-1\}$$

where s(n) is speech sample at sample index n bounded by [−1,1), the sample index corresponding to the first sample of the frame $F_k$ is $n_k$, and N is the frame length.

Successive frames may overlap each other and the number of new samples in $F_{k+1}$ relative to $F_k$ is referred to as the increment. For the purposes of this illustrative example, N is chosen as 1024 (128 ms at 8 kHz sampling) and the increment is chosen as 120 (15 ms at 8 kHz sampling). Each frame of speech is then multiplied point wise by a suitable window W to obtain the windowed speech frame $F_{k,w}$. Suitable windows are Hamming, Hann, and so forth. In this example, a raised-cosine window is used defined by $$W(i)=0.5*(1-\cos(2\cdot\pi i/N)), i=0, 1, \dots, N-1.$$

The windowed speech frame may be expressed as $$F_{k,w}=\{s(n_k+i)\cdot W(i), i=0, 1, \dots, N-1\}.$$

After composing a windowed speech frame as above, in a second step 202, its energy is computed as $$E_k=\frac{1}{N}\sum_{i=0}^{N-1}F_{k,w}^2(i),$$

and when the energy exceeds a certain threshold the frame is processed further. Otherwise, the flow is returned to the first step 201 to compose the next frame. In this illustrative example the energy threshold used is −50 dB at the nominal signal level of −26 dBov. This step 202 ensures that only frames with sufficient energy are used in the detection of band edges.

When a frame has sufficient energy, this process provides a third step 203 to normalize the frame by dividing each of its samples by the square root of its energy. Normalization ensures that each frame used in the detection of band edges is given the same weight. Those skilled in the art will recognize that alternate weighting schemes are possible. Simplifying the notation, the normalized frame may be expressed as $$x(i)=\frac{1}{\sqrt{E_k}}F_{k,w}(i),\ i=0,1,\dots,N-1.$$

The magnitude spectrum M(l) of the normalized frame is then obtained through a Fast Fourier Transform as $$X(l)=\sum_{i=0}^{N-1}x(i)\cdot e^{-j\cdot 2\pi\cdot i\cdot l/N},\ l=0,1,\dots,N-1,\text{ and}$$

-continued $$M(l)=|X(l)|,$$

where l is the frequency index and $j=\sqrt{-1}$. For N=1024, each frequency index is a multiple of the step size 8000/1024=7.8125 Hz.

In a fourth step 204, the magnitude spectrum is checked for its flatness. This can be done, for example, by estimating the spectral flatness measure (sfm) within the pass band (e.g., 300-3400 Hz). The spectral flatness measure is defined in this example as the ratio of the geometric mean to the arithmetic mean of the spectral values. The sfm ranges from 0 for a peaky, i.e., non-flat, spectrum to 1 for a perfectly flat spectrum.

In this illustrative example, the sfm is computed using 12 equal-width frequency bands within the pass band (300-3400 Hz) as follows.

$$E_{x,d}=\sum_{l=l_d=39+d*33}^{l=l_d+33}M^2(l),\ d=0,1,\dots,11,$$

$$A_{mean}=\frac{1}{12}\sum_{d=0}^{11}E_{x,d},$$

$$G_{mean}=e^{\frac{1}{12}\sum_{d=0}^{11}\log(E_{x,d})},\text{ and}$$

$$sfm=\frac{G_{mean}}{A_{mean}}.$$

When the sfm is greater than a threshold, the magnitude spectrum of the frame is used for further processing. Otherwise, the flow is returned back to the first step 201. In this illustrative example the sfm threshold is chosen as 0.5. This step ensures that the frames used for band edge detection have a reasonably flat spectrum in the pass band. Those skilled in the art will again understand that there are alternate ways to accomplish this. For example, one could compute the prediction gain of a frame using LP modeling, and select the frame for use in band edge detection only if the prediction gain is below a threshold.

When a frame has a reasonably flat spectrum, in a fifth step 205 the magnitude spectrum of the frame is accumulated and a count for frames used in the accumulation is incremented. One can also accumulate the energy spectra if desired (for example, by raising the magnitude spectra to the second power, or raising the magnitude spectra to some other power).

In a sixth step 206, the frame count for the accumulated magnitude spectrum is checked to see if it is at least equal to a specified threshold (such as, in this illustrative example, 100). When this is not the case, the flow is returned back to the first step.

When a sufficient number of magnitude spectra have been accumulated, the accumulated spectrum is further processed in a seventh step 207. First, the linear frequency cepstral coefficients (LFCC) are computed by taking an IFFT (Inverse Fast Fourier Transform) of the log-spectrum as $$C(m)=\frac{1}{N}\sum_{l=0}^{N-1}20\cdot\log_{10}[M_{acc}(l)]\cdot e^{j\cdot 2\pi\cdot l\cdot m/N},\ m=0,1,\dots,N-1$$

where $M_{acc}(l)$ represents the accumulated magnitude spectrum, C(m) represents the LFCC, and $j=\sqrt{-1}$.

The log-spectral envelope is obtained by setting all the LFCC values except the set represented by $\{C(m), m=-M_1, -(M_1-1), \ldots, 0, 1, \ldots, M_1-1, M_1\}$ to zero and taking the FFT as follows:

$$LS(l) = \sum_{m=-M_1}^{M_1} C(m) \cdot e^{-j \cdot 2\pi \cdot l \cdot m / N}$$

where negative values of m can be converted to positive values by adding N. In this illustrative example, $M_1$ is chosen as 14.

From the log-spectral envelope LS(l), the lower and higher band edges can be estimated. For example, the mean value of the log-spectrum within the pass band can be estimated as $$LS_{mean} = \frac{1}{l_{p2} - l_{p1} + 1} \sum_{l=l_{p1}}^{l_{p2}} LS(l)$$

where $l_{p1}$ and $l_{p2}$ represent the lower and higher indices within the pass band. In this illustrative example, $l_{p1}=51$ and $l_{p2}=422$.

The lower band edge can be estimated as the index $l_l$ at which the log-spectral envelope is $T_L$ dB below $LS_{mean}$. This is easily found by searching within a suitable range, such as 115-265 Hz, and selecting the index at which the log-spectral envelope value $LS(l_l)$ is closest to $(LS_{mean}-T_L)$. Alternately, one can find the two indices enclosing the desired envelope value, and use linear interpolation to obtain a fractional index value for the lower band edge.

The higher band edge $l_h$ is similarly found by searching within a suitable range, such as 3450-3750 Hz, to find the index at which $LS(l_h)$ is $(LS_{mean}-T_H)$ dB. A suitable value for the thresholds $T_L$ and $T_H$ is about 10 dB. Note that the choices of the search ranges as well as the thresholds $T_L$ and $T_H$ for the detection of both lower and higher band edges depend on the input NB speech; that is, whether the speech is clean or coded, what type of coder is used, the signal-to-noise ratio, and other factors as may uniquely apply in a given application setting. These can be chosen empirically for the best performance in a desired application. It may also be useful to process the input NB speech using a pair of notch filters with notches at about 0 Hz and 4000 Hz respectively to ensure that the log-spectral envelope decays at both edges.

The detected band edges, i.e., $l_l$ and $l_h$, are then transformed into corresponding frequency values $F_l$ and $F_h$ Hz respectively, using the detected band edges of signals with pre-designed bandwidths for calibration.

Once the band edges are detected, incorporating them in a BWE to enhance its performance is fairly straightforward. For example, assume for the sake of example that the BWE system has been designed for the bandwidth 300-3400 Hz but the actual signal bandwidth as detected by the band edge detection algorithm is 200-3600 Hz. To include the additional signal bandwidth at the high end, one can simply move the cut-off frequency of the HPF from 3400 Hz to 3600 Hz. Alternatively, one could also gradually combine the original signal and the artificially generated signal within the 3400-3600 Hz band. Similarly, at the low end, the low-band boost characteristic can be shifted lower by 100 Hz (from 300 Hz to 200 Hz).

Figure 3:
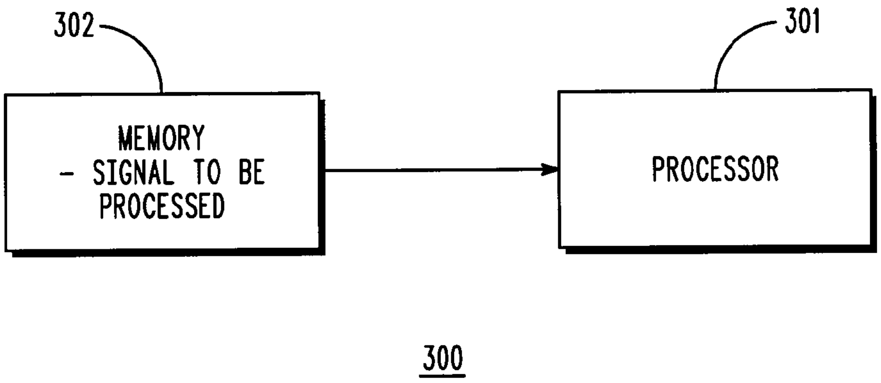
FIG. 3 comprises a block diagram as configured in accordance with various embodiments of the invention.

Those skilled in the art will appreciate that the above-described processes are readily enabled using any of a wide variety of available and/or readily configured platforms, including partially or wholly programmable platforms as are known in the art or dedicated purpose platforms as may be desired for some applications. Referring now to FIG. 3, an illustrative approach to such a platform will now be provided.

In this example, the apparatus 300 comprises a processor 301 that operably couples to a memory 302 that has the aforementioned signal to be processed stored therein. Those skilled in the art will recognize and appreciate that such a processor can comprise a fixed-purpose hard-wired platform or can comprise a partially or wholly programmable platform. All of these architectural options are well known and understood in the art and require no further description here.

This processor 301 can be configured (via, for example, corresponding programming as will be well understood by those skilled in the art) to carry out one or more of the steps, actions, and/or functions as are set forth herein. By one approach, for example, this can comprise configuring the processor 301 to perform bandwidth extension for a signal using high-band detection (as taught herein by determining the corresponding bounding frequency for the signal as pertains to each of at least some of a sequential series of groups of the sequential samples of the signal) by, at least in part, automatically performing bandwidth extension for the signal using a lowest expected value of the high-band edge, using an available narrow-band signal up to a detected high-band edge, and using a bandwidth-extended signal above the detected high band edge to represent the signal.

Much the same can be done to accommodate low-band content as well, of course. For example, by one approach, the processor 301 can be programmed to detect a low-band edge below a highest expected value of the low-band edge to provide a corresponding detected low-band edge, adjust a low-band boost characteristic based on the detected low-band edge to provide an adjusted low-band boost characteristic, and apply the adjusted low-band boost characteristic to the signal to obtain a boosted low-band signal.

Those skilled in the art will recognize and understand that such an apparatus 300 may be comprised of a plurality of physically distinct elements as is suggested by the illustration shown in FIG. 3. It is also possible, however, to view this illustration as comprising a logical view, in which case one or more of these elements can be enabled and realized via a shared platform. It will also be understood that such a shared platform may comprise a wholly or at least partially programmable platform as are known in the art.

So configured, these teachings are readily applied in conjunction with bandwidth extension methodologies to better facilitate such processes. These teachings are also highly scalable and can be used with a variety of such approaches and in conjunction with a wide variety of signals to be processed.

Those skilled in the art will recognize that a wide variety of modifications, alterations, and combinations can be made with respect to the above described embodiments without departing from the spirit and scope of the invention, and that such modifications, alterations, and combinations are to be viewed as being within the ambit of the inventive concept.

We claim:

1. A method comprising:

at a processor of a signal processing platform:

presenting a signal to be processed;

identifying signal portions of the signal that exhibit specific characteristics to provide identified signal portions, the specific characteristics comprising energy values;

using the identified signal portions to automatically determine at least one bounding frequency for the signal by computing a magnitude spectrum for each of the identified signal portions and using the magnitude spectrum to determine a corresponding measure of flatness within a pass band as pertains to a corresponding normalized signal portion to thereby provide vetted signal portions.

2. The method of claim 1 wherein presenting a signal to be processed comprises presenting audio content.

3. The method of claim 2 wherein presenting a signal further comprises presenting a plurality of sequential samples of the audio content.

4. The method of claim 3 wherein automatically determining at least one bounding frequency for the signal comprises automatically determining the at least one bounding frequency for the signal as pertains to each of at least some of a sequential series of groups of the sequential samples of the audio content.

5. The method of claim 4 wherein each group of the sequential samples of the audio content represents from about one second to about three seconds of the audio content.

6. The method of claim 1 wherein automatically determining at least one bounding frequency for the signal further comprises:

accumulating the magnitude spectrum for the vetted signal portions to provide an accumulated magnitude spectrum;

using the accumulated magnitude spectrum to estimate a signal envelope as corresponds to the vetted signal portions;

using the signal envelope to determine the at least one bounding frequency.

7. The method of claim 6 wherein using the signal envelope to determine the at least one bounding frequency comprises using the signal envelope to determine both an upper and a lower bounding frequency.

8. A method to facilitate performing bandwidth extension for a signal comprising:

at a processor of a signal processing platform:

detecting a low-band edge below a highest expected value of the low-band edge to provide a detected low-band edge;

adjusting a low-band boost characteristic based on the detected low-band edge to provide an adjusted low-band boost characteristic;

applying the adjusted low-band boost characteristic to the signal to obtain a boosted low-band signal.

* * * * *